United States Patent [19]
Tardy et al.

[11] Patent Number: 5,594,823
[45] Date of Patent: Jan. 14, 1997

[54] METHOD OF MANUFACTURING A MULTI-FIBER OPTICAL CROSS-COUPLER, AND AN OPTICAL CROSS-COUPLER OBTAINED BY PERFORMING THE METHOD

[75] Inventors: André Tardy, Egly; Jean-Pierre Dumas, Villemoisson, both of France

[73] Assignee: Alcatel Cable, Clichy Cedex, France

[21] Appl. No.: 575,528

[22] Filed: Dec. 20, 1995

[30] Foreign Application Priority Data

Dec. 21, 1994 [FR] France .................. 94 15406

[51] Int. Cl.⁶ .................... G02B 6/26
[52] U.S. Cl. ............ 385/46; 385/48; 385/115; 65/409; 65/411
[58] Field of Search ............ 65/409, 410, 411; 385/46, 48, 115, 116, 96

[56] References Cited

U.S. PATENT DOCUMENTS

| | | | |
|---|---|---|---|
| 5,212,452 | 6/1992 | Stowe et al. | 385/48 |
| 5,268,979 | 12/1993 | Weidman | 385/48 |
| 5,353,365 | 10/1994 | Dumas et al. | 385/102 |
| 5,454,057 | 9/1995 | Arima et al. | 385/46 |

FOREIGN PATENT DOCUMENTS

WO9011540  10/1990  WIPO .

OTHER PUBLICATIONS

Washington, K. Himeno et al, "Novel optical–fiber–coupler fabrication technique using multicore fibers", *OFC/l00C*, '93, San Jose, CA Feb. 21–26, 1993, Technical Digest Series, vol. 4, Conference Edition, Optical Society of America, pp. 98–99.

*Patent Abstracts of Japan*, vol. 12, No. 408 (P-778) 28 Oct. 1988 corresponding to JP-A-63 147 110 (Furukawa Electric).

*Primary Examiner*—John Ngo
*Attorney, Agent, or Firm*—Sughrue, Mion, Zinn, Macpeak & Seas

[57] ABSTRACT

The multi-fiber optical cross-coupler includes N peripheral fibers and a central fiber that are coupled together optically. The method of the invention for manufacturing such a cross-coupler consists in forming a multi-waveguide conductor by drawing a composite primary preform, the waveguides of the conductor being cylindrical elementary fibers embedded so that they are mutually parallel in mechanical and optical coupling cladding, said waveguides defining the fibers of the cross-coupler, and having optogeometrical characteristics so that they are optically coupled over a defined length of said conductor, which length is cut off accordingly. Application to an optical coupler.

12 Claims, 2 Drawing Sheets

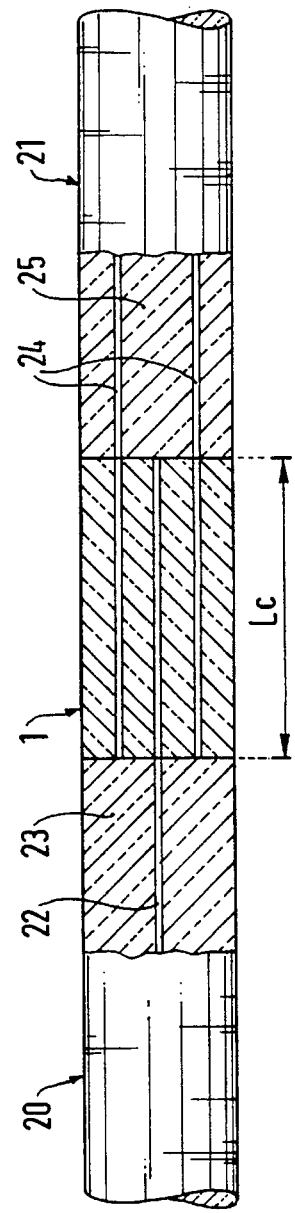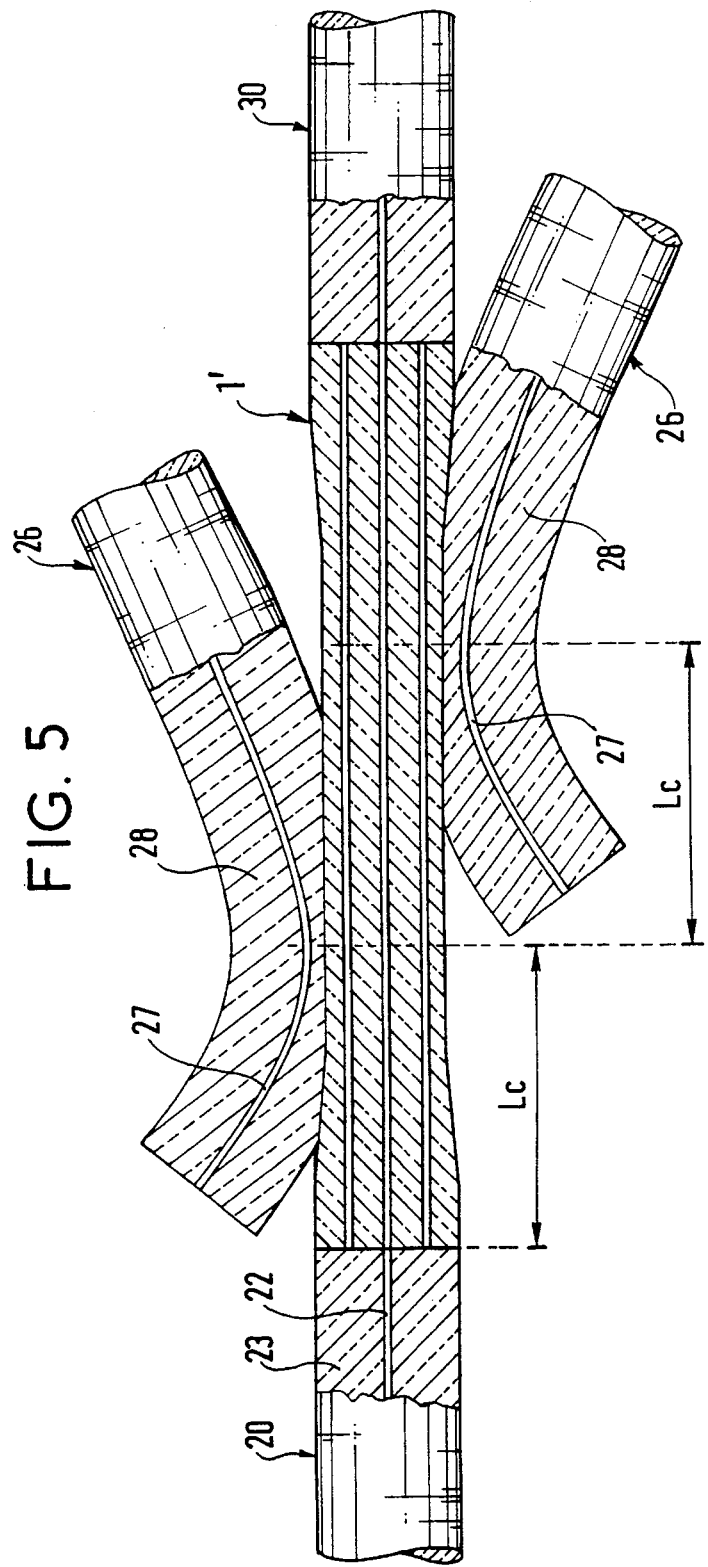

METHOD OF MANUFACTURING A MULTI-FIBER OPTICAL CROSS-COUPLER, AND AN OPTICAL CROSS-COUPLER OBTAINED BY PERFORMING THE METHOD

The present invention relates to a method of manufacturing a multi-fiber optical cross-coupler and to an optical cross-coupler obtained by performing the method.

BACKGROUND OF THE INVENTION

The term "multi-fiber cross-coupler" refers to a cross-coupler including a plurality of single-core optical fibers, each of which has a core surrounded by cylindrical optical cladding.

In general, in a conventional single-core optical fiber, the core diameter lies in the range 7 microns to 10 microns, and the outside diameter of the optical cladding is 125 microns. Commonly, such a conventional single-core fiber is surrounded by at least one protective layer around its optical cladding. It is said to be "stripped" in the absence of any protective layer around its optical cladding.

The term "multi-core optical fiber" refers to an optical fiber including a plurality of "elementary" fibers, each of which also has a core surrounded by optical cladding. In each elementary fiber, the core also has a diameter lying in the approximate range 7 microns to 10 microns, but the optical cladding has a small outside diameter lying in the range 25 microns to 40 microns. The elementary fibers of a multi-core fiber are mechanically secured together in cylindrical cladding that has a diameter of 125 microns, while being optically independent from one another.

A multi-fiber optical cross-coupler is designed to provide optical coupling between its fibers.

An article entitled "Monolithic wavelength-flattened 1 ×7 single-mode fused fiber couplers: theory, fabrication, and analysis" published in "Applied Optics", vol. 30, No. 6, Feb. 20, 1991 describes such a multi-fiber optical cross-coupler.

That known cross-coupler includes 7 stripped conventional single-core fibers assembled together so that they touch one another inside a capillary tube and optically coupled together locally inside the tube, one of the fibers being central, and the others being peripheral. The optical coupling is obtained by necking the tube containing the 7 fibers, i.e. by forming a bi-conical taper in said tube. The energy injected into the central fiber via a first one of its ends propagates along the central fiber only until it reaches the taper, where it is distributed between the 7 fibers, and it propagates along all 7 fibers from the taper.

The taper is formed by subjecting the tube to localized heating resulting in the optical cladding inside the tube fusing, and by drawing the resulting assembly.

The taper causes optical coupling to occur between the central fiber and each of the peripheral fibers, and it causes optical coupling to occur between adjacent peripheral optical fibers. The coupling depends on the degree of fusion of the optical cladding, on the peripheral and longitudinal dimensions of the taper, and on the corresponding geometrical deformations in the optical cladding of the fibers inside the tube. It is difficult to control these parameters so as to achieve the desired optical coupling between the fibers. For this purpose, the energy received at the second end of the fibers is monitored dynamically so as to detect the optical coupling obtained, and so as to stop heating and drawing when the optical coupling obtained is the desired optical coupling.

OBJECT AND BRIEF SUMMARY OF THE INVENTION

An object of the present invention is to provide a multi-fiber optical cross-coupler which makes it possible to obtain coupling that is defined and accurately reproducible from one cross-coupler to another, and which is easy and quick to manufacture without it being necessary for the optical coupling obtained to be monitored dynamically.

The present invention provides a method of manufacturing a multi-fiber optical cross-coupler, said cross-coupler including peripheral optical fibers and a central optical fiber that are at least locally coupled together optically and mechanically wherein the method consists in forming a multi-waveguide cylindrical optical conductor containing N peripheral waveguides and one central waveguide, all of which are cylindrical, parallel and secured together in mechanical and optical coupling cladding, by drawing a primary preform corresponding to said conductor said waveguides respectively defining said fibers and having mutually relative opto-geometrical characteristics in said coupling cladding so that they are optically coupled over a defined length of said conductor, and wherein the method further consists in cutting off a segment of said conductor, said segment having a length equal to an odd integer number of times said defined length so as to obtain said cross-coupler.

Furthermore, advantageously:

with each waveguide comprising a core and optical cladding, the refractive index difference lies in the range $2 \times 10^{-3}$ to $3 \times 10^{-3}$;

the distance between the axis of each peripheral waveguide and the axis of the central waveguide lies in the range 30 microns to 40 microns; and the primary preform is formed firstly by assembling together a central preform element and N peripheral preform elements on a rod which is provided with an axial bore for receiving said central preform element and N fluting channels on its periphery for receiving the N peripheral preform elements, and secondly by building up said rod and said N peripheral preform elements installed in the channels so as to form a cylindrical coating on the rod, said waveguides being derived from said preform elements and said coupling cladding being derived from said rod and from said coating, by means of the drawing operation.

The present invention also provides a cross-coupler obtained by performing the method said cross-coupler having an outside diameter of substantially 125 microns.

Furthermore, advantageously:

the peripheral waveguides are substantially uniformly distributed around said central waveguide;

the peripheral waveguides are mutually identical, with the optical cladding of each of them having an outside diameter lying in the range 20 microns to 30 microns, and the core of each of them having a diameter lying in the range 7 microns to 10 microns, the optical cladding of said central waveguide has an outside diameter that also lies in the range 20 microns to 30 microns, and the core of the central waveguide has a diameter lying in the range 7 microns to 12 microns;

the cross-coupler is provided firstly with a stripped single-core fiber of the same diameter as the cross-coupler, axially aligned with and welded to one end of said cross-coupler, and secondly with an output lead-out constituted by a multi-core fiber having the same diameter as said cross-coupler and having N cores disposed in the same geometrical configuration as the N peripheral waveguides, which lead-out is axially and angularly aligned with and welded to the other end of said cross-coupler; and the cross-coupler is provided firstly with an input lead-in constituted by an input stripped single-core fiber of the same diameter as the cross-coupler, axially aligned with and welded to an "input" end of said cross-coupler, and secondly with output lead-outs, each of which is constituted by an output stripped single-core fiber welded to the periphery of said cross-coupler and at a distance from said input end that is equal to a odd integer number of times said defined length, while being placed facing one of said peripheral waveguides and being coupled thereto optically by evanescent-wave coupling.

The characteristics and advantages of the invention appear from the following description of a preferred embodiment given by way of example and with reference to the accompanying drawings, in which:

FIG. 4 is a diagrammatic section view of said cross-coupler as provided with a single-core input lead-in fiber and with a multi-core output lead-out fiber; and FIG. 5 is diagrammatic section view showing how the above-mentioned cross-coupler may be coupled to single-core fibers, on of which is an input fiber, the others being output fibers.

Figure 1:
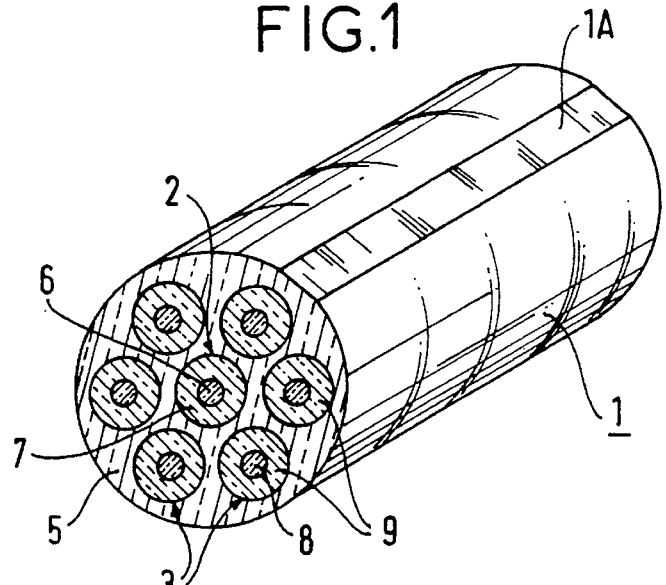
FIG. 1 is a perspective view of a cross-coupler of the invention.
Figure 2:
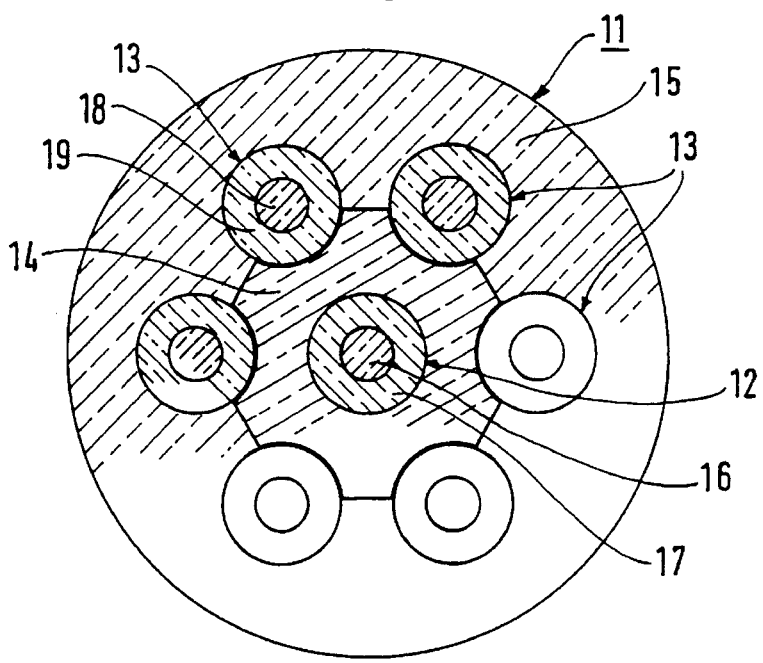
FIG. 2 is a view partially in section through a "primary" preform from which the cross-coupler is obtained.
Figure 3:
FIG. 3 is an elevation view of a multi-waveguide optical conductor obtained from the primary preform.

As shown in FIGS. 1 to 3, the optical cross-coupler 1 of the invention (FIG. 1) is a monolithic component constituted by a segment, of defined length, of a multi-waveguide cylindrical optical conductor 10 (FIG. 3) itself resulting from fiber-drawing a primary preform 11 (FIG. 2). The primary preform and the optical conductor 10 are geometrically similar in a certain ratio.

The component parts of the optical cross-coupler and of the optical conductor are identical and are designated by the same references in FIGS. 1 and 3. They correspond to the component parts of the primary preform 11.

Both the cross-coupler 1 and the conductor 10 comprise a central waveguide 2 and N peripheral waveguides 3, all of which are cylindrical and embedded parallel to one another without touching inside a cylindrical mechanical and optical coupling cladding 5.

The central waveguide comprises a core 6 surrounded by optical cladding 7. Each peripheral waveguide likewise comprises a core 8 and optical cladding 9. The waveguides 2 and 3 are identical or substantially identical elementary optical fibers in which the refractive index difference between the core and the optical cladding of each of them lies in the range $2 \times 10^{-3}$ to $3 \times 10^{-3}$ and is in particular $2.5 \times 10^{-3}$.

The cladding 5 providing mechanical and optical coupling between the elementary fibers has a refractive index that is as close as possible to that of the optical cladding of each of them.

In the embodiment shown, there are six peripheral waveguides 3 uniformly distributed around the central waveguide. They are as identical as possible to one another and to the central waveguide. The distance between the axes of adjacent peripheral waveguides is identical to the distance between the axis of any one of them and the axis of the central waveguide.

The cross-coupler preferably has an outside diameter of 125 microns, given by the diameter of the coupling cladding 5. Each of the waveguides has an outside diameter lying in the range 20 microns to 30 microns, and in particular 25 microns, given by the optical cladding of each elementary fiber. The distance between the axes of adjacent peripheral waveguides, and the distance between the axis of each peripheral waveguide and the axis of the central waveguide is about 35 microns. Under these conditions, all of the energy received in the central waveguide is uniformly distributed between all seven waveguides after a propagation length equal to the coupling length Lc which is about 20 mm, or equal to an odd multiple of the coupling length Lc. Indeed, the length of the cross-coupler is equal to the coupling length Lc or to an odd multiple of the coupling length.

The coupling length is defined accurately as a function of the refractive index difference between the core and the optical cladding of each of the waveguides, and of the distance between the axes of adjacent peripheral waveguides or between each peripheral waveguide and the central waveguide.

It can then be understood that it is easy to use the same long multi-fiber optical conductor 10 to make a series of cross-couplers having identical and predefined optical characteristics, and having geometrical dimensions that are also identical, with the possible exception of their lengths. Such cross-couplers are segments of suitable length of the conductor.

The conductor 10 is obtained by subjecting the primary preform 11 to fiber-drawing.

The primary preform 11 comprises a central preform element 12 corresponding to the waveguide 2, and N peripheral preform elements 13 corresponding to the waveguides 3. The preform elements are mounted on a rod 14 which is provided both with an axial bore (not referenced) for receiving the central preform element, and also with straight peripheral fluting channels of semi-circular cross-section (not referenced) for receiving the peripheral preform elements. The resulting assembly then receives a peripheral coating 15. Both the rod 14 and the coating 15 are made of silica.

The coating is formed by any commonly-used building-up method, e.g. by plasma deposition, and it gives the assembly the cylindrical shape and the diameter of the resulting primary preform.

Each of the preform elements has a core 16 or 18, and optical cladding 17 or 19, depending on whether the preform in question is the central preform element or one of the peripheral preform elements. The core and the optical cladding correspond to the core and to the optical cladding of a respective one of the waveguides of the optical conductor. The rod 14 corresponds to the inner portion of the cladding 5, and the coating 15 corresponds to the outer portion of the same cladding 5. The refractive index of the rod and of the coating is as close as possible to that of the optical cladding of each elementary fiber or of each preform element.

In a variant on the embodiment shown in FIG. 2, and in FIGS. 1 and 3, the central preform element has a core diameter that is slightly larger than that of the peripheral preform elements. The diameter of the optical cladding of the central preform element remains substantially identical to that of the optical cladding of each peripheral preform element. For example, the diameter of the core 16 of the central waveguide of the conductor or of the cross-coupler may be 12 microns, while the core diameter of the peripheral waveguides is 10 microns. Under these conditions, almost all of the energy injected into the central waveguide of the cross-coupler is distributed between its peripheral waveguides.

In another variant, the energy distribution between the peripheral waveguides may be non-uniform, and it may comply with a distribution pattern predetermined by the specifications of a telecommunications system coupled to the cross-coupler. Such non-uniform and predetermined distribution may be obtained by varying the angular and/or radial disposition of the peripheral waveguides around the central waveguide, or by retaining a uniform angular disposition while varying the distance between the axis of the central waveguide and the axis of each of the peripheral waveguides. The angular or radial positions of the peripheral waveguides around the central waveguide cause optical coupling to differ in staggered manner in particular between each peripheral waveguide and the central waveguide.

In the preferred embodiment shown, the cross-coupler includes six peripheral waveguides around the central waveguide, so as to optimize the number of waveguides in the segment of conductor whose diameter is 125 microns. Also in a variant, the cross-coupler may include a number of peripheral waveguides less than 6.

By way of example, FIG. 4 shows the above-mentioned cross-coupler 1 equipped with an input lead-in fiber 20 and with an output lead-out fiber 21.

The input lead-in fiber 20 is a stripped conventional single-core fiber having the same diameter as the cross-coupler and comprising a core 22 surrounded by optical cladding 23. It is aligned axially with and welded to one of the ends of the cross-coupler. The output lead-out fiber 21 is a multi-core fiber having the same outside diameter as the cross-coupler 1, and including N cores or elementary fibers 24 in mechanical and optical coupling cladding 25, the N cores having the same geometrical disposition as the N peripheral waveguides, and N being in particular 6 for a cross-coupler 1 that has six peripheral waveguides. The multi-core fiber is welded to the other end of the cross-coupler after it has been angularly aligned relative to the cross-coupler so that the N cores are respectively optically aligned with the N peripheral waveguides.

Longitudinal marking on the periphery of the cross-coupler 1, e.g. in the form of a flat 1A (FIG. 1), resulting from corresponding marking (not shown) on the conductor and/or on the primary preform, and corresponding marking (not shown) provided on the multi-core fiber facilitate their relative angular positioning.

FIG. 5 shows how the peripheral waveguides of the cross-coupler, referenced 1, may be coupled to output single-core fibers 26 and to the above-mentioned input lead-in fiber 20. Each of the fibers 26 has a core 27 surrounded by optical cladding 28.

Where N=6, as shown, the fibers 26 are distributed between two levels or sets on the periphery of the cross-coupler, each set being advantageously formed of three single-core fibers, only one of which is shown. The first coupling level between three single-core fibers 26 and three non-adjacent waveguides of the cross-coupler is formed at a distance from the input end of the cross-coupler equal to the above-mentioned coupling length Lc, or to an odd multiple of that length. The second coupling level is distant from the first coupling level by the length Lc or by an odd multiple thereof. The length of the cross-coupler is then chosen accordingly for the two coupling levels.

Each output single-core fiber 26 is coupled to a respective one of the peripheral waveguides 3 of the cross-coupler by pre-machining both the output single-core fiber and the cross-coupler, so as to reduce the thickness of the cladding between the core of the fiber and the core of the waveguide, and by welding the single-core fiber facing the waveguide to the periphery of the cross-coupler. The coupling obtained is evanescent-wave optical coupling between the core of the fiber 26 and the core of the waveguide 3, causing the energy propagating through the guide 3 to be transferred to the output fiber 26, for a coupling length less than 10 mm when the distance between the two cores in question is in the approximate range 10 microns to 20 microns.

It should be noted that an additional output single-core fiber 30 is welded to the end of the cross-coupler. This fiber 30 is thus coupled to the central waveguide 2 of the cross-coupler.

Naturally, the cross-coupler may be coupled to output single-core fibers in a manner that is different while remaining analogous to evanescent-wave coupling between a multi-core fiber and single-core fibers.

We claim:

1. A method of manufacturing a multi-fiber optical cross-coupler, said cross-coupler including peripheral optical fibers and a central optical fiber that are at least locally coupled together optically and mechanically, wherein the method consists in forming a multi-waveguide cylindrical optical conductor containing N peripheral waveguides and one central waveguide, all of which are cylindrical, parallel and secured together in mechanical and optical coupling cladding, by drawing a primary preform corresponding to said conductor, said waveguides respectively defining said fibers, and having mutually relative opto-geometrical characteristics in said coupling cladding so that they are optically coupled over a defined length of said conductor, and wherein the method further consists in cutting off a segment of said conductor, said segment having a length equal to an odd integer number of times said defined length so as to obtain said cross-coupler.

2. A method according to claim 1, wherein, with each waveguide comprising a core and optical cladding as does each fiber, the method consists in choosing a refractive index difference between said core and said optical cladding of each waveguide that lies in the range $2\times10^{-3}$ to $3\times10^{-3}$, and in choosing a refractive index for said coupling cladding that is substantially equal to that of said optical cladding.

3. A method according to claim 2, consisting in securing together said waveguides in said coupling cladding, and in obtaining a distance between the axis of each peripheral waveguide and the axis of the central waveguide that lies in the range 30 microns to 40 microns.

4. A method according to claim 2, consisting in forming said primary preform firstly by assembling together a central preform element and N peripheral preform elements on a rod which is provided with an axial bore for receiving said central preform element and N straight fluting channels on its periphery for receiving the N peripheral preform elements, said preform elements and said waveguides being geometrically similar in a given ratio, and secondly by building up said rod and said N peripheral preform elements so as to obtain a cylindrical peripheral coating, said rod and said coating being geometrically similar to said coupling cladding in the same ratio.

5. A method according to claim 2, consisting in defining angular and radial positions for the adjacent peripheral waveguides relative to said central waveguide using a predetermined coupling relationship between the central waveguide and each peripheral waveguide, and between the adjacent peripheral waveguides.

6. A cross-coupler obtained by performing the method according to claim 2, wherein said cross-coupler has an outside diameter of substantially 125 microns.

7. A cross-coupler according to claim 6, wherein said peripheral waveguides are substantially uniformly distributed around said central waveguide.

8. A cross-coupler according to claim 6, wherein said peripheral waveguides are mutually identical, with the optical cladding of each of them having an outside diameter lying in the range 20 microns to 30 microns, and the core of each of them having a diameter lying in the range 7 microns to 10 microns, and wherein the optical cladding of said central waveguide has an outside diameter that also lies in the range 20 microns to 30 microns, and the core of the central waveguide has a diameter lying in the range 7 microns to 12 microns.

9. A cross-coupler according to claim 7, further provided firstly with an input lead-in constituted by a stripped single-core fiber of the same diameter as the cross-coupler, axially aligned with and welded to one end of said cross-coupler, and secondly with an output lead-out constituted by a multi-core fiber having the same diameter as said cross-coupler and having N cores disposed in the same geometrical configuration as the N peripheral waveguides, which lead-out is axially and angularly aligned with and welded to the other end of said cross-coupler.

10. A cross-coupler according to claim 7, further provided firstly with an input lead-in constituted by an input stripped single-core fiber of the same diameter as the cross-coupler, axially aligned with and welded to an "input" end of said cross-coupler, and secondly with output lead-outs, each of which is constituted by an output stripped single-core fiber welded to the periphery of said cross-coupler and at a distance from said input end that is equal to a odd integer number of times said defined length, while being placed facing one of said peripheral waveguides and being coupled thereto optically by evanescent-wave coupling.

11. A cross-coupler according to claim 1, including N output single-core fibers coupled in sets of at least two at coupling levels that are offset from one another along the cross-coupler.

12. A cross-coupler according to claim 10, further provided with an additional output single-core fiber having the same diameter as the cross-coupler, and axially aligned with and welded to the other end of said cross-coupler.

* * * * *